US007080016B2

(12) United States Patent
Miyashita et al.

(10) Patent No.: US 7,080,016 B2
(45) Date of Patent: Jul. 18, 2006

(54) AUDIO INFORMATION REPRODUCTION DEVICE AND AUDIO INFORMATION REPRODUCTION SYSTEM

(75) Inventors: Masahiko Miyashita, Saitama (JP); Koji Ogura, Saitama (JP); Kensuke Chiba, Saitama (JP); Takeaki Funada, Saitama (JP)

(73) Assignee: Pioneer Corporation, Tokyo (JP)

( * ) Notice: Subject to any disclaimer, the term of this patent is extended or adjusted under 35 U.S.C. 154(b) by 852 days.

(21) Appl. No.: 10/251,990

(22) Filed: Sep. 23, 2002

(65) Prior Publication Data

US 2003/0065517 A1 Apr. 3, 2003

(30) Foreign Application Priority Data

Sep. 28, 2001 (JP) ........................ P 2001-303026

(51) Int. Cl.
*G01H 7/00* (2006.01)

(52) U.S. Cl. ........................ 704/278; 704/270; 84/636

(58) Field of Classification Search .................... None
See application file for complete search history.

(56) References Cited

U.S. PATENT DOCUMENTS 5,256,832 A * 10/1993 Miyake ...................... 84/636

FOREIGN PATENT DOCUMENTS

| | | | |
|---|---|---|---|
| EP | 0 944 034 | A1 | 9/1999 |
| EP | 0 977 171 | A1 | 2/2000 |
| EP | 1 073 055 | A2 | 1/2001 |
| EP | 1 073 056 | A2 | 1/2001 |
| JP | 8-201542 | A | 8/1996 |

OTHER PUBLICATIONS

Scheirer E D: "Tempo and Beat Analysis of Acoustic Musical Signals", Journal of the Acoustical Society of America, American Institute of Physics. New York, US,vol. 103, No. 1, Jan. 1998, pp. 588-601, XP008007174.

* cited by examiner

*Primary Examiner*—David D. Knepper
(74) *Attorney, Agent, or Firm*—Sughrue Mion, PLLC

(57) ABSTRACT

Audio information is read out of a recording medium which records musical pieces as audio information. The audio information read out is processed to detect BPM values and positions of beats in the musical piece. A musical piece is reproduced from the recording medium by reproducing audio information in accordance with the detected BPM values and positions of beats. The BPM value indicates the tempo of a musical piece, and the beat indicates a strength of a sound which repeatedly appears in each musical piece. When the audio information is reproduced in accordance with the detected BPM values and positions of beats, the musical piece is reproduced at the correct tempo and beats without giving an unnatural feeling to the listener.

20 Claims, 8 Drawing Sheets

FIG. 6A

| UNDER JUDGEMENT | TIME INTERVAL FROM PRECEDING PEAK | NUMBER OF BEATS | JUDGEMENT OF CONDITION 1 |
|---|---|---|---|
| p2 | p2 - p1 = 12 | 12/8 = 1.5 | NG |
| p3 | p3 - p2 = 4 | 4/8 = 0.5 | NG |
| p4 | p4 - p3 = 8.5 | 8.5/8 = 1.0625 | OK |
| p5 | p5 - p4 = 15.5 | 15.5/8 = 1.9375 | OK |
| p6 | p6 - p5 = 20 | 20/8 = 2.5 | NG |
| p7 | p7 - p6 = 20 | 20/8 = 2.5 | NG |
| p8 | p8 - p7 = 8 | 8/8 = 1 | NG |

FIG. 6B

| UNDER JUDGEMENT | TIME INTERVAL FROM PRECEDING BEAT | NUMBER OF BEATS | JUDGEMENT OF CONDITION 2 |
|---|---|---|---|
| p1 | p1 | (TREATED AS BEAT SINCE IT IS FIRST PEAK) | OK |
| p2 | p2 - p1 = 12 | 12/8 = 1.5 | NG |
| p3 | p3 - p1 = 16 | 16/8 = 2 | OK |
| p4 | p4 - p1 = 24.5 | 24.5/8 = 3.0625 | OK |
| p5 | p5 - p4 = 15.5 | 15.5/8 = 1.9375 | OK |
| p6 | p6 - p5 = 20 | 20/8 = 2.5 | NG |
| p7 | p7 - p5 = 40 | 40/8 = 5 | OK |
| p8 | p8 - p5 = 48 | 48/8 = 6 | OK |

FIG. 6C

| UNDER JUDGEMENT | JUDGEMENT OF CONDITION 1 | JUDGEMENT OF CONDITION 2 | FINAL JUDGEMENT |
|---|---|---|---|
| p1 | – | (TREATED AS BEAT SINCE IT IS FIRST PEAK) | (OK) |
| p2 | NG | NG | NG |
| p3 | NG | OK | NG |
| p4 | OK | OK | OK |
| p5 | OK | OK | OK |
| p6 | NG | NG | NG |
| p7 | NG | OK | NG |
| p8 | NG | OK | NG |

AUDIO INFORMATION REPRODUCTION DEVICE AND AUDIO INFORMATION REPRODUCTION SYSTEM

BACKGROUND OF THE INVENTION

The present disclosure relates to the subject matter contained in Japanese Patent Application No. 2001-303026 filed on Sep. 28, 2001, which is incorporated here by reference in its entirely.

The present invention relates to a technical field of a reproduction device for reproducing audio information from a recording medium containing audio information corresponding to a musical piece. More particularly, the invention relates to an audio information reproduction device which enables a called disk jockey to successively reproduce musical pieces from a plurality of recording media.

Recently, in a place or facility, called a club, a music editor, called a disk jockey, selects and reproduces dance musical pieces, people enjoy dancing to those edited musical pieces. Usually, many musical pieces reproduced for dance music have each a length of several minutes. The disk jockey skillfully connects a plurality of musical pieces in an uninterrupted fashion, and reproduces them. Accordingly, people can enjoy dancing while being little aware of the connections of musical pieces.

To uninterruptedly reproduce a plurality of musical pieces, when the reproducing operation of one musical piece ends, the reproduced sound volume is gradually decreased, while at the same time the reproducing operation of the next musical piece is started and the sound volume is gradually increased. In this way, two pieces of music are connected uninterruptedly. In a case where the audio recording medium of the disk type is utilized, at least two disk players are prepared, and a musical piece is first reproduced from one sheet of music disk. When the reproducing operation of the musical piece draws to an end, the disk jockey operates the other disk player and starts the reproducing operation of another musical piece from another music disk. If the two musical pieces to be connected are not harmonious in rhythm, the listener feels clumsy at the connection of the two musical pieces.

In connection with this, there is known an audio information reproduction device which detects BPMs (beat per minute; corresponds to a speed of a music) from the audio data of the two musical pieces, and controls a reproducing rate of the disk player so that those BPMs are equal to each other. A method of detecting the BPMs from the audio data of the musical pieces is disclosed in the Unexamined Japanese Patent Application Publication No. Hei 8-201542, for example.

Even in a case where the BPMs are detected and the rates of reproducing the two musical pieces to be connected are made to be equal to each other, if the beat of one musical piece is shifted in position from that of the other musical piece, the listener feels something unnatural again.

SUMMARY OF THE INVENTION

Accordingly, an object of the present invention is to provide an audio information reproduction device which when a disk jockey, for example, connects two musical pieces and uninterruptedly reproduces them, it can reproduce the musical pieces in a state that those musical pieces are coincident with each other in reproducing rates and beat positions.

According to one aspect of the present invention, there is provided an audio information reproduction device comprising: reading member for reading audio information constituting a musical piece from a recording medium; beat detecting member for detecting a beat position in the musical piece on the basis of the audio information; and reproducing member for reproducing the audio information in accordance with the detected beat position.

According to a similar aspect of the invention, there is provided a computer program causing a computer to operate as an audio information reproduction device which includes reading member for reading audio information constituting a musical piece from a recording medium, beat detecting member for detecting a beat position in the musical piece on the basis of the audio information, and reproducing member for reproducing the audio information in accordance with the detected beat position.

In the audio information reproduction device, audio information is read out from a recording medium, such as an optical disk, which contains music pieces recorded thereon as audio information. The audio information as read out is appropriately processed to detect positions of beats in the music piece. The audio information is reproduced based on the detected beat positions, whereby the music piece is reproduced from the recording medium.

The beat indicates a strength of the sound which repeatedly appears in each music piece. Therefore, when the audio information is reproduced based on the detected beat positions, the music piece is reproduced at correct beats while giving no unnatural feeling to the listener.

In one preferred embodiment of the audio information reproduction device, the reproduction device further includes tempo detecting member for detecting a speed value of the musical piece in accordance with audio information. In the audio information reproduction device, the beat detecting member detects the beat position by using the speed value.

In the embodiment, a speed value of the music piece is detected from the audio information read out from the recording medium. The speed value may be a BPM (beat per minute) value indicating the number of beats per unit time (minute), and indicates a speed or tempo of music. In the musical piece, beats appear at fixed time intervals, which depend on a tempo of the musical piece. Therefore, if the beat positions are detected based on the detected speed value, the beat positions can be detected accurately.

In another embodiment, the beat detecting member includes level detecting member for detecting peak levels of the audio information, and judging member for judging if the peak level corresponds to a beat.

In the embodiment, levels of audio information as read out from the recording medium are detected and the peaks of those levels are detected. A plurality of peaks are detected on the basis of the strength of a musical sound in a musical piece. Judgement is made as to whether or not the detected peaks correspond to beats. The beat corresponds to the strength of a sound in the musical sound, particularly a strong part of the sound. Therefore, the beat may correctly be detected by selectively judging the plurality of detected peaks.

In yet another embodiment of the audio information reproduction device, the judging member includes first judging member for judging as to if a peak being evaluated of the audio information satisfies a first condition that a time interval between the peak being evaluated and a peak preceding the peak being evaluated is integer time as long as a beat-to-beat time interval determined on the basis of the speed value, second judging member for judging as to if the peak being evaluated satisfies a second condition that a time interval between the peak being evaluated and a peak which is located preceding the peak being evaluated and is judged to be a beat, is integer time as long as a beat-to-beat time interval determined on the basis of the speed value, and member for judging the peak being evaluated to be a beat if the peak being evaluated satisfies the first and second conditions.

In the embodiment, judgement is made as to if a plurality of peaks detected from the audio information are beats, on the basis of two conditions. The first condition is that a time interval between the peak being evaluated and a peak preceding the peak being evaluated is integer time as long as a beat-to-beat time interval determined on the basis of the speed value. The second condition is that a time interval between the peak being evaluated and a peak which is located preceding the peak being evaluated and is judged to be a beat, is integer time as long as a beat-to-beat time interval determined on the basis of the speed value.

Beats in a musical piece repeatedly appear at fixed periods in accordance with the tempo of the musical piece. Theoretically, the beats must appear at a time interval integer time as long as a beat-to-beat time which is determined on the basis of the speed value, e.g., BPM. The beat-to-beat time is a time distance between one beat and the subsequent beat, and takes one value determined by the speed value. Therefore, a peak corresponding to a beat must appear at a position on the time axis after a time integer time as long as the beat-to-beat time elapses from a peak corresponding to a beat preceding the former. The second condition checks this presumption, and only the peaks which satisfy the second condition are beat candidates.

The beat judgement based on only the second condition leads to the following misjudgement: When the peak which is judged to be corresponding to the preceding beat actually does not correspond to the beat in the musical piece (viz., it is misjudged to be the beat), the subsequent beats will be misjudged at the period of the misjudged beats. When the peaks recurring at a period of time are misjudged to be beats, peaks corresponding to actual beats must appear at time positions located out of the period of those peaks. If only the peaks defined such that the time interval between successively appearing peaks is integer time as long as the beat-to-beat time are determined to be the beats, then correct beats will be detected on the basis of the peaks appearing at the positions of the correct beats.

Thus, if only the peaks which satisfy both the first and second conditions are judged to be beats, an exact beat detection is performed.

In an additional audio information reproduction device, aid judging member further includes decision member operating such that when a time interval between the peak being evaluated and a peak which is located preceding the peak being evaluated and is judged to be a beat, is longer than a time interval corresponding to a predetermined number of times as long as the beat-to-beat time interval determined on the basis of the speed value, the decision member decides that a beat is present at a position on a time axis spaced from the peak located preceding the peak being evaluated by a distance corresponding to the predetermined number of times as long as the beat-to-beat time interval.

In the embodiment, when such a peak as being evaluated as a beat does not appear for a predetermined time or longer, the subsequent beat detection does not work well. To avoid this, the beats are forcibly determined. In this case, even if the beat that is forcibly determined is not correct, correct beat detection will be performed since the beat detection is made taking the first condition into account. Thus, the beat detection process will smoothly proceed when the beat is forcibly determined.

In a further embodiment, the judging member further includes member which judges a peak that the level detecting member first detects after the reading of the audio information corresponding to one piece of music starts, to be a beat.

In this embodiment, the judgement of the condition 2 cannot be made unless the peak that was judged as the beat is present. For this reason, the peak first detected in the musical piece is forcibly judged as a beat, and the subsequent beat detection is made smooth. Even if the beat that is forcibly judged is not correct, the judgement involving the condition 1 is made, and hence correct beats will be detected with proceeding with the subsequent beat detection.

Another embodiment of the audio information reproduction device further comprises member for interpolating the detected beat position on the basis of the speed value and a beat position detected by the beat detecting member.

Of those detected beats, scarce beats are replenished with the interpolation. The beats detection is based on the peaks of the audio information levels. Even in a case where the peak corresponds to the beat position, if the audio information level is low, it is not detected as a beat. Accordingly, all the beats in the musical piece are not always detected. To cope with this, necessary interpolation is carried out on the basis of the detected beats, periodical beat positions are set by the interpolation, and the musical piece is reproduced in accordance with the resultant.

In a still another embodiment, the audio information reproduction device further comprises member for predicting a beat position on the basis of the speed value and a beat position detected by the beat detecting member.

In the embodiment, in the reproduction device of the type in which the musical piece is reproduced prior to the beat detecting process. Future beat positions are predicted on the basis of the already detected beat positions, and the musical piece is reproduced on the basis of the predicted beat positions.

In a further embodiment of the invention, the level detecting member includes member for dividing the audio information into plural pieces of information of a plurality of frequency bands, and member for detecting the peak by adding together the audio information of the frequency bands which are close to each other in time space.

The audio information is divided into plural pieces of information of a plurality of frequency bands. The levels of the information of those frequency bands are added together to detect peaks of the audio information. Therefore, where noise is contained in the audio information read out of the recording medium, noise influence is lessened and exact peak detection is secured.

In another embodiment, the level detecting member further includes member for setting a peak at a position on a time axis after a predetermined time elapses from a position of the peak lastly detected when the peak is not detected for a predetermined time or longer.

In the embodiment, when the peak is not detected from the audio information for a long time, the peak is forcibly set. In some musical piece, even at the position of the beat, the audio information level is low. A peak as a candidate for a beat is set forcibly to some extent, the beat judgement is made, and smooth execution of the beat detecting process is secured.

According to another aspect of the invention, there is provided an audio information reproduction system comprising: first and second audio information reproduction devices constructed described above; and control member for controlling the first and second audio information reproduction devices so that the speed values and beat positions of first reproduced audio information output from the first audio information reproduction device are coincident with those of second reproduced audio information output from the second audio information reproduction device.

In the audio information reproduction system, the reproducing operations of musical pieces from two audio information reproduction devices are performed in synchronism with each other. The process of synchronizing the two audio information reproduction devices is carried out such that the speed value and the beat position of the audio information reproduced from one audio information reproduction device are coincident in value and position with those of the audio information reproduced from the other audio information reproduction device. With the synchronizing reproducing operations, when a disk jockey or the like changes from one or first musical piece to another or second musical piece, the first musical piece is switched to the second musical piece in a state that the tempo and beat position of the first musical piece are coincident with those of the second musical piece. There is less chance that the listener has the unnatural feeling.

In a preferred embodiment of the audio information reproduction system, the control member includes member for controlling the second audio information reproduction device so that a tempo value of the second reproduced audio information is coincident with that of the first reproduced audio information, and member for controlling the second audio information reproduction device so that a beat position of the second reproduced audio information is coincident with that of the first reproduced audio information in a state that a tempo value of the first reproduced audio information is coincident with that of the second reproduced audio information.

In the embodiment, in reproduced audio information from the two audio information reproduction devices, the reproducing rates of the devices are controlled so that the speed values such as BPM values are equal to each other, and the reproduction positions of the audio information reproduction devices are controlled so that in a state that the reproducing speeds are equal to each other, the beat positions are also coincident with each other.

In a further embodiment of the audio information reproduction system, the first audio information reproduction device includes first top beat detecting member for detecting a position of a top beat in the first reproduced audio information, the second audio information reproduction device includes second top beat detecting member for detecting a position of a top beat in the second reproduced audio information, and the control member controls the second audio information reproduction device so that the top beat of the second reproduced audio information is coincident in position with that of the first reproduced audio information.

In this embodiment, the top beat is detected from each audio information. Here, the top beat is a downbeat located at the top of a bar partially constituting a musical piece. Therefore, if the audio information reproduction devices are operated for reproducing so that the top beats of the audio information reproduced from the two audio information reproduction devices are coincident in position with each other, the reproduction positions of the two musical pieces may be made coincident with each other every bar. And the listener is given no unnatural feeling.

In an additional embodiment of the audio information reproduction device, the first and second top beat detecting member detect each the timing at which an operator operates an input device as the position of the top beat.

In the embodiment, the operator listens to the reproduced musical piece and manually inputs the top beat position to the device. Therefore, the beat position may easily be detected with a simple construction.

In a further embodiment of the invention, the first and second top beat detecting member detect a position of each top beat on the basis of time management information stored for each musical piece on the recording medium.

In the embodiment, each position of the top beat is automatically detected on the basis of time management information stored for each musical piece on the recording medium. In the case of the disk type recording medium, such as a CD, information (time code, address, etc.) representing a time elapsing from the top of a musical piece stored is stored in the recording medium for each musical piece recorded. Usually, it infrequently happens that the tempo (i.e., BPM value) varies in one musical piece. Therefore, a time corresponding to a bar of the musical piece may be calculated by using the BPM value. For this reason, the position of the top of the bar in the musical piece may be detected by referring to the time management information.

According to a further aspect of the present invention, there is provided an audio information reproduction device comprising: reading member for reading audio information constituting a musical piece from a recording medium; tempo detecting member for detecting a speed value in the musical piece on the basis of the audio information; beat detecting member for detecting a position of a beat in the musical piece from audio information by using the speed value; top beat detecting member for detecting a position of a top beat in the reproduced audio information; and reproducing member for reproducing the audio information in accordance with the speed value, the beat position, and the top beat position.

In the audio information reproduction device thus constructed, audio information corresponding to a musical piece is read out from a recording medium. A speed value and a beat position of the musical piece are detected from the readout information, and a position of the top beat in the audio information is detected. The reproducing member reproduces the audio information on the basis of the speed value, beat position and the top beat position. As a result, the musical piece is reproduced at the correct tempo and time.

In an embodiment of the audio information reproduction system, the top beat detecting member detects the position of the top beat on the basis of time management information stored for each musical piece on the recording medium.

In the embodiment, the top beat of each musical piece is automatically detected on the basis of time management information stored for each musical piece on the recording medium. In the case of the disk type recording medium, such as a CD, information (time code, address, etc.) representing a time elapsing from the top beat of a musical piece stored is stored in the recording medium. Usually, it in frequently happens that the tempo (i.e., BPM value) varies in one musical piece. Therefore, the top, or top beat, of a bar in the musical piece may be detected by referring to the time management information.

BRIEF DESCRIPTION OF THE DRAWING

FIGS. 6A to 6C are tables showing beat detection process.

DETAILED DESCRIPTION OF THE PREFERRED EMBODIMENTS

[Prerequisite Knowledge]

Before proceeding with detailed description of the embodiments, a concept of the beat will briefly be described.

A beat is a basic unit in a time continuity of music, and indicates a strength of a musical sound which repeatedly appears in each musical piece. The beat consists of a downbeat and an upbeat, and a combination of those downbeats and upbeats forms each bar of a musical piece. In a duple time, one bar consists of a downbeat and an upbeat. In a triple time, one bar consists of a downbeat, an upbeat and an upbeat. In a quadruple time, one bar consists of a downbeat, an upbeat, medium beat, and upbeat. In the specification, the downbeat located at the top of one bar, viz., at the first position of one bar, is called "top beat".

[Audio Information Reproduction Device]

The preferred embodiment of the present invention will be described with reference to the accompanying drawings. In the embodiments to be described hereunder, the present invention is applied to an audio information reproduction device which is used for playing musical pieces in the club, and includes a mixer for generating musical pieces to be played by mixing musical pieces output from a plurality of players.

Figure 1:
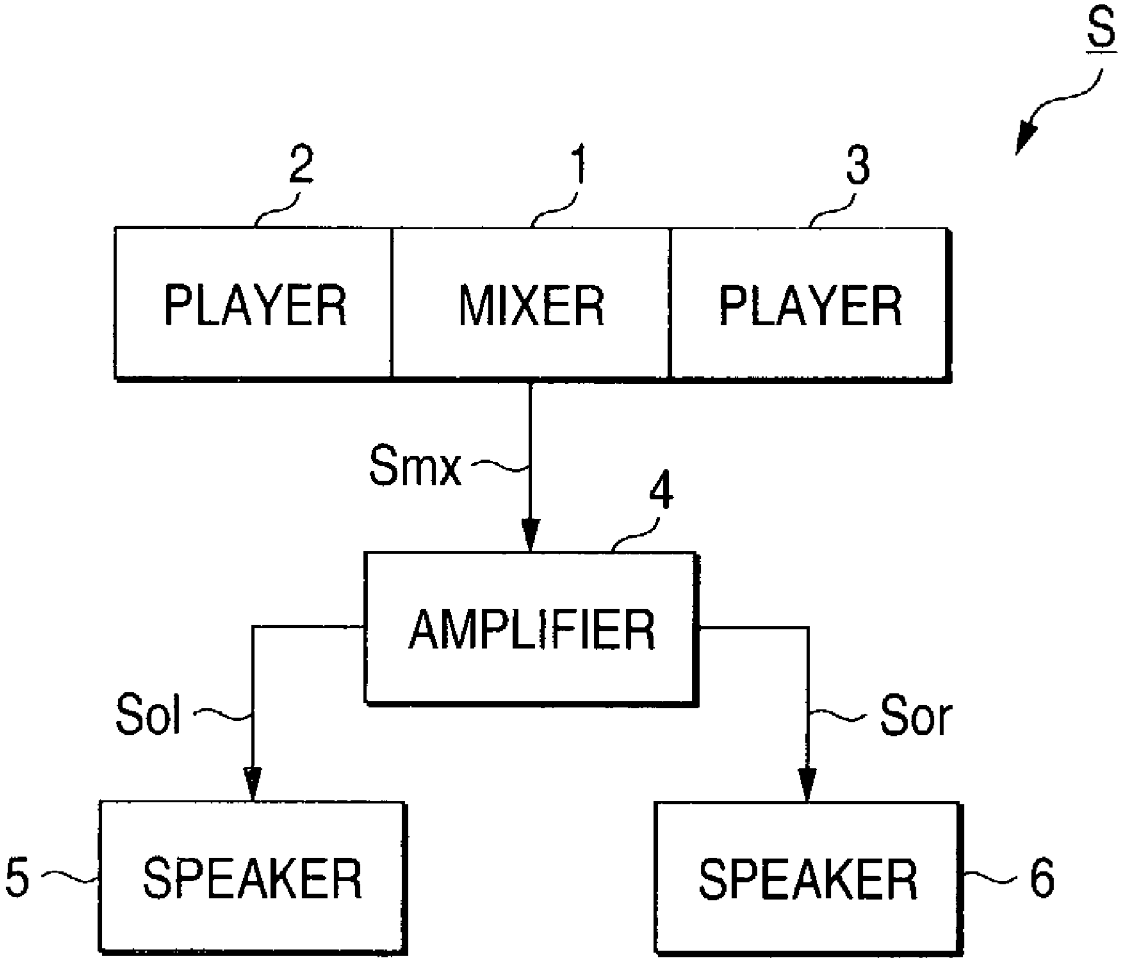
FIG. 1 is a block diagram showing an arrangement of an audio information reproduction device, which is an embodiment of the invention.

An overall arrangement of the audio information reproduction device and operation of it will first be described with reference to FIG. 1. FIG. 1 is a block diagram showing an arrangement of an audio information reproduction device which is an embodiment of the invention.

As shown in FIG. 1, an audio information reproduction device S of the embodiment includes a mixer 1, players 2 and 3, an amplifier 4 and speakers 5 and 6. The players 2 and 3 may be analog players which reproduce a called analog record or digital players which digitally reproduce a CD (Compact Disk) or a DVD. The players 2 and 3 may be constructed by using a personal computer or the like. A music files stored in CD, DVD, memory card or a hard disk is reproduced by executing a reproduction software (program). In the description to be given hereunder, the players 2 and 3 are of the type in which digital audio information is reproduced from an optical disk such as a CD.

Actually, the mixer 1 and the players 2 and 3 are integrally installed in an audio rack or the like.

Arrangements and operations of the respective portions of the embodiment will be described.

To start, each of the players 2 and 3 reproduces an optical disk, generates a musical piece signal containing a plurality of musical pieces, and outputs the resultant signal to the mixer 1. The mixer 1 mixes the generated musical piece signals through the operation of the disk jockey, to thereby generate a mixer signal Smx, and outputs the resultant signal to the amplifier 4.

The amplifier 4 amplifies each musical piece information contained in the mixer signal Smx, and generates a left signal Sol containing audio information (including both sound information by musical instruments and the like and voice information by singing and the like: The same shall apply hereinafter.) to be included in a left channel and a right signal Sor containing audio information to be included in a right channel. Then, the amplifier 4 outputs the left signal Sol and the right signal Sor to the speaker 5 for the left channel and the speaker 6 for the right channel, respectively. With this, the speakers 5 and 6 output the audio information as sounds, which are correspondingly contained in the left signal Sol and the right signal Sor.

Figure 2:
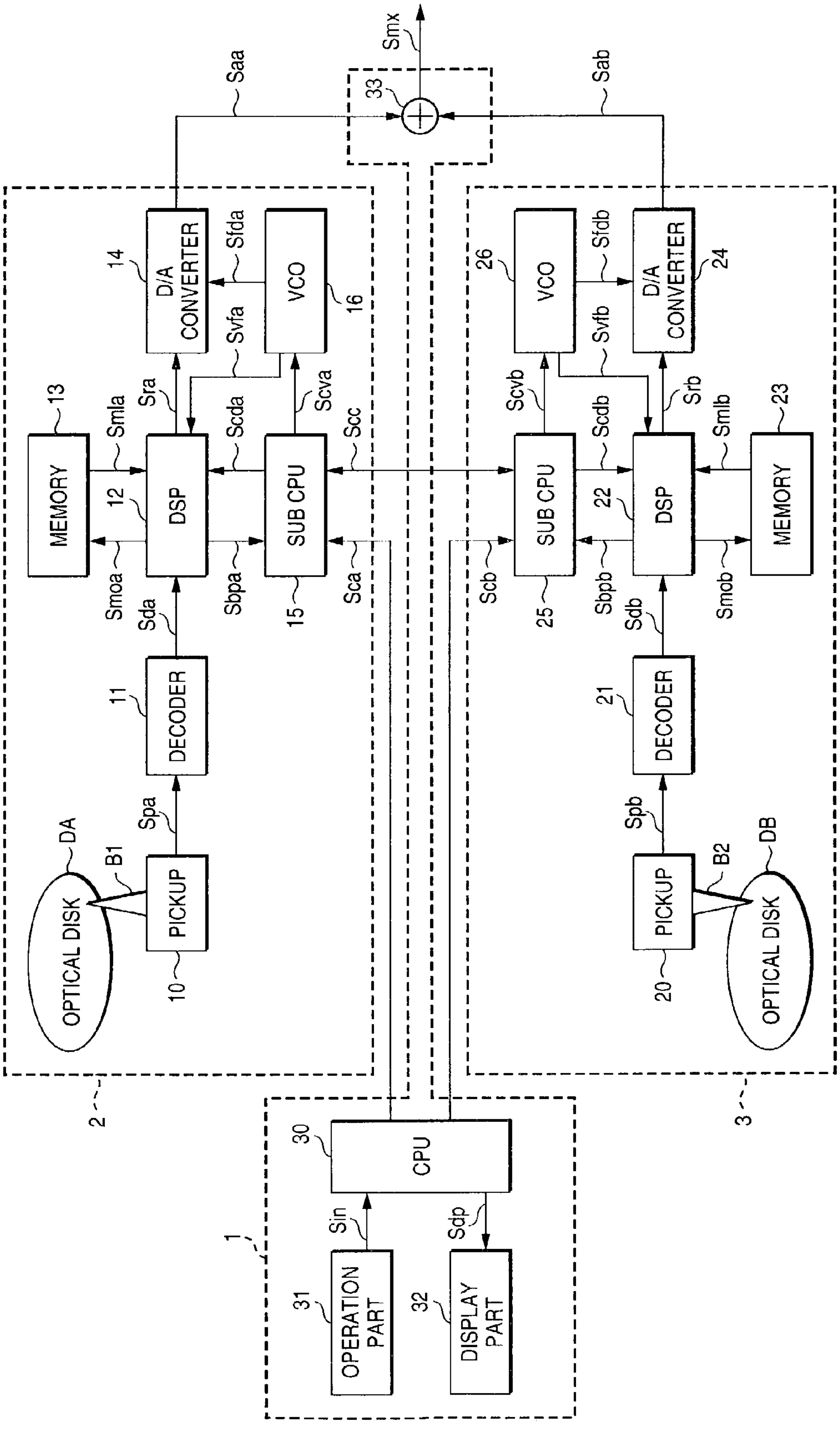
FIG. 2 is a block diagram showing the detail arrangement of the FIG. 1 audio information reproduction device.

The detailed arrangement including the mixer 1 and the players 2 and 3, which is constructed according to the invention will be described with reference to FIG. 2. FIG. 2 is a block diagram showing the detailed arrangement including the mixer 1 and the players 2 and 3, which is constructed according to the invention.

The player 2 reproduces an optical disk DA on which musical pieces to be reproduced are stored as digital audio information. As shown in FIG. 2, the player 2 includes a pickup 10, decoder 11, DSP (Digital Signal Processor) 12, memory 13, D/A (Digital/Analog) converter 14, sub CPU 15 and a VCO (Voltage Controlled Oscillator) 16.

The player 3 reproduces an optical disk DB on which musical pieces to be reproduced are stored. The player 3 has a configuration similar to that of the player 2. Specifically, the player 3 includes a pickup 20, decoder 21, DSP 22, memory 23, D/A converter 24, sub CPU 25 and a VCO 26.

The mixer 1 includes a CPU 30, operation part 31, display part 32 and an adder 33.

Operations of the respective portions of the embodiment will be described. In the description to follow, the players 2 and 3 operate in a similar manner, and hence, the operation of one of the players will typically be described.

In a case where the player 2 (3) reproduces a dance musical piece from the optical disk DA (DB) on which the musical piece is stored, the pickup 10 (20) first drives a light source (not shown) formed with a semiconductor laser or the like to thereby emit a light beam B1 (B2) for reproducing. The pickup receives a reflected light from the optical disk DA (DB), generates a reproducing signal Spa (Spb) as an RF (Radio Frequency) signal which corresponds to the musical piece stored on the optical disk DA (DB), and then outputs the generated signal to the decoder 11 (21).

Upon receipt of the signal, the decoder 11 (21) carries out a waveform shaping process, a decoding process and an amplifying process on the reproducing signal Spa (Spb) as input, then digitizes it to thereby generate a digital decode signal Sda (Sdb), and outputs the resultant signal to the DSP 12 (22).

The generation of the reproducing signal Spa (Spb) in the pickup 10 (20) and the generation of the digital decode signal Sda (Sdb) in the decoder 11 (21) are executed at high speed, e.g., quadruple-speed. The generated digital decode signal Sda (Sdb) is output to the DSP 12 (22) at the quadruple-speed.

The DSP 12 (22) detects a BPM (Beat Per Minute) value of the musical piece to be reproduced, which is contained in the digital decode signal Sda (Sdb) as input, and detects a beat position contained in the musical piece to be reproduced. Then, the DSP 12 (22) outputs a synchronous control signal Sbpa (Sbpb) containing information of the BPM value and the beat position to the sub CPU 15 (25). The DSP 12 (22) caries out various processes to be described later on the digital decode signal Sda (Sdb) in accordance with a control signal Scda (Scdb) to be described later coming from the sub CPU 15 (25), and generates and outputs a musical piece signal Sra (Srb) to the D/A converter 14 (24).

At this time, the DSP 12 (22) temporarily stores data, which is necessary to carry out the process, as a memory signal Smoa (Smob) on to the memory 13 (23), and then executes the process while reading the stored data as a memory signal Smia (Smib) from the memory 13 (23). A series of processes ranging from the process of detecting the reproducing signal Spa (Spb) from the optical disk DA (DB) to the process of storing the memory signal Smoa (Smob) to the memory 13 (23), is executed at high speed, e.g., the quadruple-speed. The process of reading the memory signal Smia (Smib) from the memory 13 (23) and subsequent ones are executed at a normal speed (one time as high as the original speed).

The D/A converter 14 (24) converts the processed musical piece signal Sra (Srb) into an analog signal to thereby generate an analog musical piece signal Saa (Sab), and outputs the generated signal to the adder 33.

At this time, a reading rate of the musical piece signal Sra (Srb) from the DSP 12 (22) and a digital/analog conversion frequency (conversion rate) in the D/A converter 14 (24), are controlled in accordance with rate control signals Sfva and Sfda (Sfvb and Sfdb) coming from the VCO 16 (26). More specifically, even if the inputting rate of the digital decode signal Sda (Sdb) to the DSP 12 (22) corresponds to the quadruple-speed, the inputting rate is treated as the normal speed.

The adder 33 adds the analog musical piece signals Saa and Sab thereby generating the mixer signal Smx as an output of the mixer 1, and outputs the generated signal to the amplifier 4.

In the processes of the above-mentioned portions, the sub CPU 15 (25) operates in accordance with a control signal Sca (Scb) from the CPU 30 and the synchronous control signal Sbpa (Sbpb) from the DSP 12 (22), and transfers and receives a control signal Scc to and from the CPU 30 and the DSP 12 (22). In this state, the sub CPU 15 (25) generates the control signal Scda (Scdb), and outputs the generated signal to the DSP 12 (22).

Concurrent with this, the sub CPU 15 (25) generates a control signal Scva (Scvb) for controlling the operation of the VCO 16 (26) and outputs the generated signal to the VCO 16 (26). To control the output rate of the musical piece signal Sra (Srb) output from the DSP 12 (22) and the digital/analog conversion frequency in the D/A converter 14 (24), as described above, the VCO 16 (26) generates the rate control signals Sfva and Sfda (Sfvb and Sfdb), and outputs the generated signals to the DSP 12 (22) and the D/A converter 14 (24), respectively.

Further, the CPU 30 generates the control signal Sca (Scb), and outputs the generated signal to the sub CPU 15 (25) to cause the sub CPU 15 (25) to execute the reproducing control as mentioned above.

At this time, operation for designating the operations of the mixer 1 and players 2 and 3, is performed by the operation part 31 by way of the CPU 30. Responding to this, an operation signal Sin corresponding to the operation is output to the CPU 30. The CPU 30 executes the control on the basis of the operation signal Sin.

The information (specifically, the detected BPM value and the like) on the operation of the mixer 1 and the players 2 and 3, which are controlled by the CPU 30, is output as a display signal Sdp from the CPU 30, and is displayed on the display part 32 for a disk jockey and the like.

[DSP Configuration and Operation]

The DSPs 12 and 22 will be described. The configuration of the DSP 12 is the same as that of the DSP 22, and hence the DSP 12 will typically be described.

Figure 3:
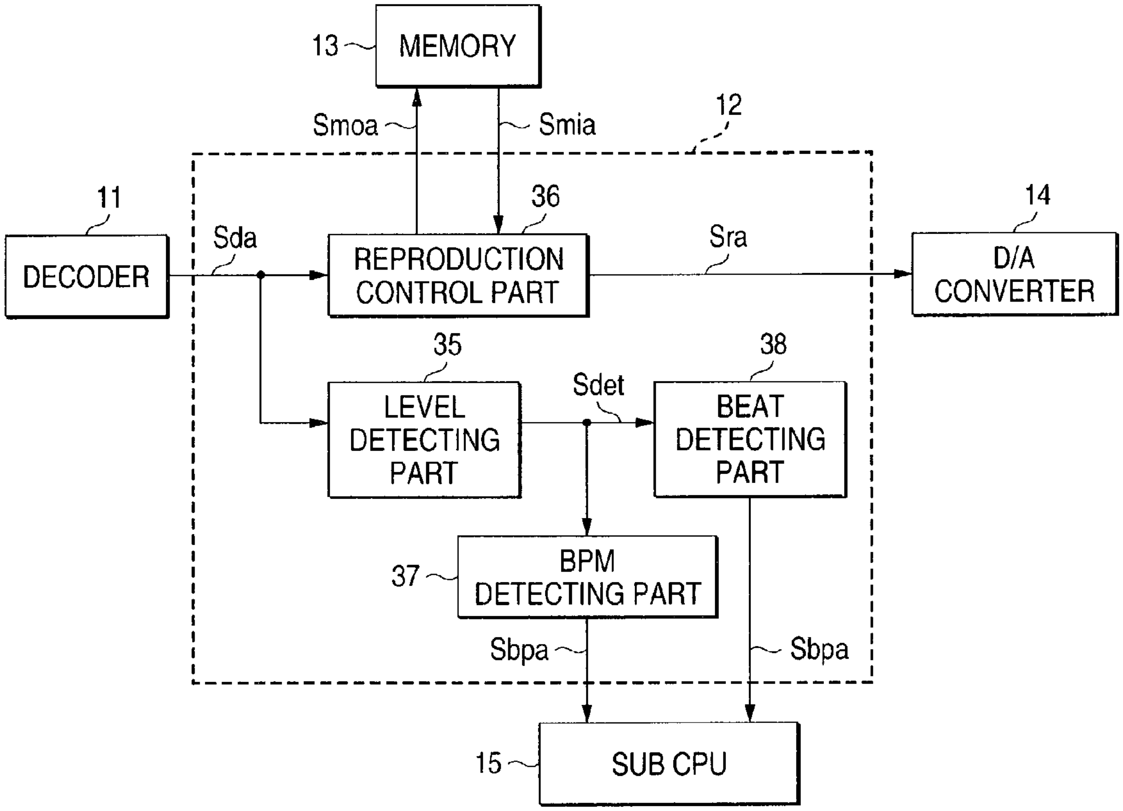
FIG. 3 is a block diagram showing an internal configuration of the FIG. 2 DSP.

FIG. 3 schematically shows an internal configuration of the DSP 12. In the description to follow, of those elements forming the DSP, those elements relating to the beat detection of the invention will mainly be described. As shown in FIG. 3, the DSP 12 includes a level detecting part 35, a reproduction control part 36, a BPM detecting part 37 and a beat detecting part 38.

The digital decode signal Sda output from the decoder 11, is input to the reproduction control part 36. The digital decode signal Sda is read out at the quadruple-speed, and is supplied as the memory signal Smoa to the memory 13 by the reproduction control part 36. The reproduction control part 36 reads out the audio reproducing signal, which is temporarily stored in the memory 13, as the memory signal Smia at the normal speed, and supplies it as the reproducing signal Sra to the D/A converter 14. In this way, the audio signal is reproduced from the optical disk DA.

The digital decode signal Sda output from the decoder 11 is also input to the level detecting part 35. The level detecting part 35 detects a level of audio data contained in the digital decode signal Sda read out from the optical disk DA, and supplies a level detect signal Sdet to the BPM detecting part 37 and the beat detecting part 38.

In the embodiment, the level detecting part 35 divides the digital decode signal Sda into signals of three frequency bands, i.e., low, medium and high frequency bands, and detects a signal level of each frequency band to thereby generate a level detect signal (digital data value) representing a level of the audio signal contained in the audio signal. And, the level detecting part 35 supplies level detect signals of the frequency bands as the level detect signals Sdet to the BPM detecting part 37 and beat detecting part 38.

Figure 4:
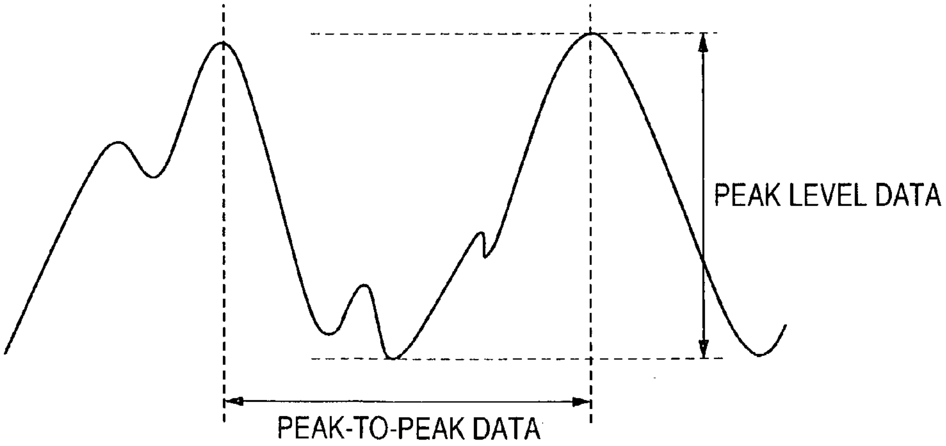
FIG. 4 is a waveform conceptually showing a BPM detection process executed by the DSP.

The BPM detecting part 37 computes a BPM on the basis of the level detect signals of the frequency bands, adds it to the synchronous control signal Sbpa, and then supplies the resultant signal to the sub CPU 15. To be more specific, as shown in FIG. 4, the BPM detecting part detects a peak of an audio signal waveform on the basis of the level detect signal Sdet from the level detecting part 35, and computes a time interval between the detected peak and the subsequent one. If the detected peak corresponds to the beat position of the musical piece, the BPM (the number of the beats per minute) is obtained by computing. Actually, the detection of a peak-to-peak time interval is performed for a predetermined time, and the detected values of the peak-to-peak time intervals are statistically processed, whereby the BPM is computed. For the detail of the BPM detection method, reference is made to the Unexamined Japanese Patent Application Publication No. Hei 8-201542.

The beat detecting part 38 detects beat positions in the audio reproducing signal on the basis of the level detect signal Sdet of each frequency band output from the level detecting part 38, adds a signal representing the beat positions to the synchronous control signal Sbpa, and then supplies the resultant signal to the sub CPU 15.

In this way, the DSP 12 generates the reproducing control signal Sbpa containing information of the BPM value and the beat positions of the reproduced audio information on the basis of the digital decode signal Sda output from the decoder 11, and supplies the resultant signal to the sub CPU 15.

On the other hand, the DSP 22 in the player 3 executes a similar process to that of the DSP 12.

And, the DSP 22 supplies the reproducing control signal Sbpb containing information of the BPM value and the beat positions of the reproduced audio information to the sub CPU 25, on the basis of the digital decode signal Sdb output from the decoder 21.

As will be described later, the CPU 30 causes the two players 2 and 3 to synchronously reproduce the two players 2 and 3 in accordance with the reproducing control signals Sbpa and Sbpb.

[Detection of Beat Position]

A method of detecting a beat position will be described in detail. A beat position is detected on the basis of a level detect signal for each frequency band output from the level detecting part 35. In the embodiment, the level detecting part 35 detects a reproduced audio signal level for each of three frequency bands, i.e., low, medium and high frequency bands.

The beat detection process detects (1) peaks of reproduced audio signal levels of all the frequency bands on the basis of the reproduced audio signal levels of those three frequency bands. (2) The beat detection process judges as to whether or not those detected peaks correspond to the beats in the reproduced audio signal, on the basis of two conditions, and detects the beat positions based on the judgement result.

Figure 5A:
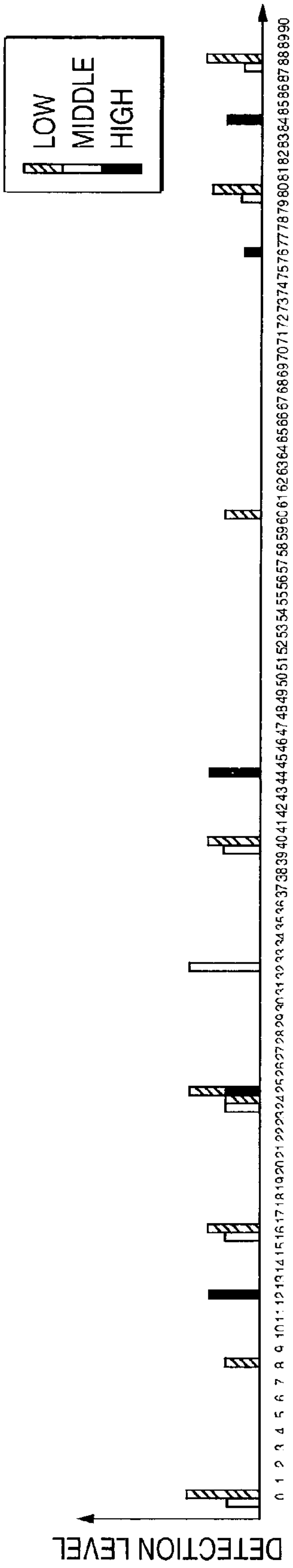
FIGS. 5A and 5B are waveform conceptually showing part of a beat detection process executed by the DSP.

The peak detection of the reproduced audio signals of all the frequency bands will be described with reference to FIG. 5. FIG. 5A is a graph showing level detect signals of three frequency bands output from the level detecting part 35. In FIG. 5A, the abscissa represents time, and numerals attached to the abscissa each indicate a specific time width (referred to as "point"), which depends a BPM of the reproduced audio signal. In a musical piece to be reproduced which is quadruple and 120 BPM in tempo, if one beat corresponds to 8 points, then one point correspond to 1/16 second. The time axis is used for the sake of convenience. Accordingly, for another musical piece having different tempo, the time axis is also different from the former, as a matter of course. The ordinate of the graph of FIG. 5A represents a detection level of a reproduced audio signal (digital signal), which is detected by the level detecting part 35.

As shown in FIG. 5A, signal levels of reproduced audio signals of the respective frequency bands (low, medium and high) are time sequentially arranged. Of the reproduced audio signals detected, those audio signals that are closely located on the time axis are added together to produce an added value.

Figure 5B:
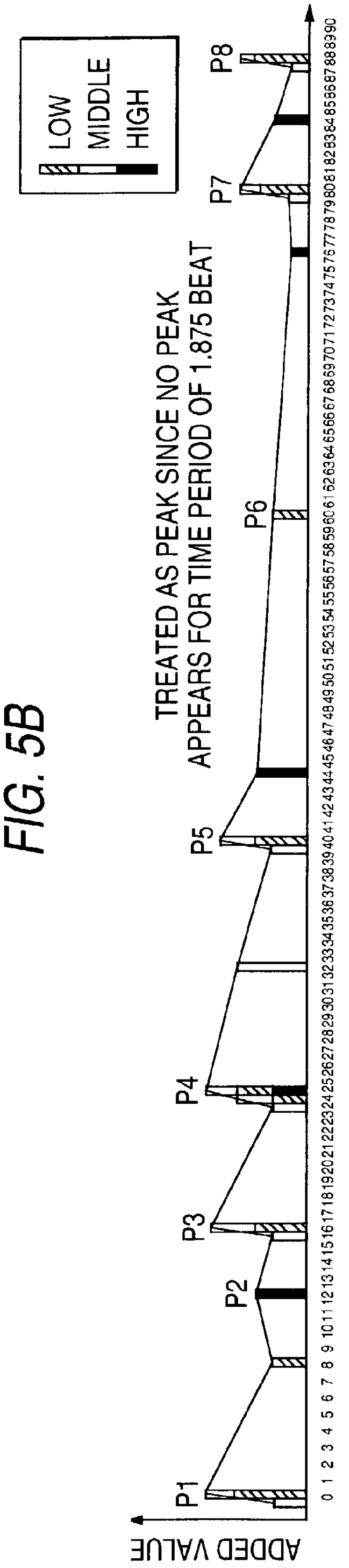

In the graph of FIG. 5B, the ordinate represents the added values thus computed, and the abscissa represents the same time axis as in FIG. 5A. The wording "are closely located on the time axis" means "are located within a predetermined time width". In the instance of FIG. 5A, data that are located within (1/8) beat is trated as data that are closely located on the time axis. In the instance of FIGS. 5A and 5B, one beat corresponds to 8 points. Accordingly, data are added which are present within a range of adjacent two points (viz., adjacent data are added).

The added values are computed as shown in FIG. 5B. An added value next obtained is compared in level with the added values preceding and subsequent to it, whereby detecting a peak of the added value. The added values are connected by straight lines to form a polygonal graph as shown in FIG. B, and only the peak so the graph are selected (the bottoms are not selected). In the instance of FIG. 5B, the peaks P1 to P5, P7 and p8 are selected.

The peaks are thus selected. In the graph shown in FIG. FIG. 5B, a case is present where peaks do not appear for a predetermined time or longer. In the case, a peak is forcibly set. In this instance, when a peak does not appear for a time period of about two or more beats, data that is present at a second beat position or there around as counted from the preceding peak, is treated as a peak. In the instance of FIG. 5B, this peak problem is handled allowing for an error of ±1/8 beat for 2 beats. As shown, a peak does not appear for a time period of 1.875 (1+7/8) beat. Accordingly, the data of the peak P6 is forcibly treated as a peak.

In this way, the peaks contained in the reproduced audio signal are detected. Those peaks are high level parts in the reproduced audio signal. Accordingly, it may be considered that those peaks are candidates for the beats in the musical piece.

Then, judgement is made as to whether or not those peaks obtained as beat candidates are beats. If a peak satisfies both the following two conditions, the peak is judged to be a beat.

(Condition 1):

A time interval between a peak being evaluated and a peak located preceding the former peak corresponds to integer time (integer=1 to 4) as long as the beat-to-beat time interval computed based on the BPM (containing a predetermined error)

(Condition 2):

A time interval between a peak being evaluated and a beat position (a position of a peak judged to be a beat) located preceding the former peak corresponds to integer time as long as the beat-to-beat time interval computed based on the BPM (containing a predetermined error).

With regard to the condition 2, if a peak already judged to be a beat is present, the next beat position may be predicted, to some extent, on the basis of the BPM. Accordingly, a peak which is present at a position at which the next beat will appear is judged as a beat, and its near position.

The condition 1 is for preventing the following disadvantage. If a peak which actually does not correspond to a beat is mistakenly judged to be a beat, the subsequent beat detection will continue while being based on the erroneous beat position and remaining not corrected.

Errors in the conditions 1 and 2 may each be about ±1/16 of 1 to 4 integer time as long as the beat-to-beat interval.

Next, a beat detection process utilizing the conditions 1 and 2 will be described in detail with reference to FIGS. 5 and 6. FIG. 6 shows a beat detection result on the reproduced audio signal shown in FIGS. 5A and 5B. FIG. 6A shows the judgement result on the condition 1. FIG. 6B shows the judgement result on the condition 2. FIG. 6C shows the final judgement results on the conditions 1 and 2.

An exemplary judgement on the condition 1 will be described with reference to FIG. 6A. As shown in FIG. 5B, a time interval between each of the peaks P1 to P8 gathered in the above-mentioned manner and a peak preceding the former is computed. And a number of beats corresponding to the time interval is computed. The results of the computation are shown in FIG. 6A.

If the time interval between the present peak and the preceding peak is integer (1 to 4) times as long as the beat-to-beat time, which is computed from the BPM, its peak is judged to be a beat. In this instance, ±1/16 of the beat-to-beat time as is computed form the BPM is treated as a tolerable error. As seen from FIG. 6A, the judgement results on the peaks p4 and p5 are "OK", and those satisfy the condition 1.

An exemplary judgement on the condition 2 will be described with reference to FIG. 6B. A time interval between each of the peaks P1 to P8 shown in FIG. 5B and a beat preceding that peak is computed. Computation is made to check as to whether or not each of the computed time intervals is integer times as long as a beat-to-beat time computed based on the BPM. The computation results are shown in FIG. 6B. If the computed time interval is integer times as long as a beat-to-beat time computed based on the BPM, the peak is judged to be a beat.

In this instance, ±1/16 of the beat-to-beat time computed from the BPM is treated as a tolerable error. After the reproduction of the musical piece starts, the peak that first appears is treated as a beat since no beat preceding the first peak is present. As seen from FIG. 6B, the peaks p1, p3, p4, p5, p7 and p8 are "OK" and satisfy the condition 2.

From the judgement results of the conditions 1 and 2, only peaks satisfying both the conditions are judged to be beats. The results of the judgement are shown in FIG. 6C. As seen, the peaks p1, p4 and p5 are finally judged as beats.

The peak p1 is forcibly determined to be a beat since it is the peak that is first detected after the music reproduction starts. A case that the determination is erroneous, viz., the peak p1 is not the beat is present, as a matter of course. In the beat detection process of the invention, the final beat detection is based on the condition 1 as well as the condition 2. Accordingly, a correct beat will be detected with time.

Specifically, in the condition 1, only those peaks are detected: a time interval between each of those peaks and a peak preceding the peak is integer times as long as a beat-to-beat time interval determined on the basis of the BPM. If the decision that the peak p1 is a beat is erroneous, a peak corresponding to a position of a correct beat must be detected with proceeding with the beat detection based on the above-mentioned method (The reason for this is that a reproduced audio signal having a definite peak must appear at a correct beat position in the musical piece under reproduction.). Accordingly, after a peak corresponding to such a correct beat position is detected, only a peak located at a position defined by an integer time as long as the beat-to-beat time based on the BPM is judged to be a beat on the basis of the condition 1. As a result, correct beat positions will be detected subsequently. Thus, the beat is detected taking the condition 1 into account. Accordingly, an erroneous judgement, which maybe made if only the condition 2 is used, may be corrected.

Such an erroneous judgement is likely to occur in a musical piece which is relatively quiet at first (a musical piece that starts in low level). In a first part of the musical piece, a reproduced audio signal which is clearly large in level is not detected even at correct beat positions. Accordingly, it happens that by the judgement based on the condition 2, a peak that first appears is forcibly treated as a beat, and actually, the peak position is not the correct beat position. However, if the judgement based on the combination of the conditions 1 and 2 is continued, reproduced data of which the level is clearly large at a correct beat position of the musical piece will appear. Subsequently, correct beat positions will be detected.

In the condition 2, if a time interval between a peak being evaluated and a beat located preceding the judged peak is 4 beats or longer, the peak is forcibly determined to be a beat. The reason for this is that if the beat is not judged for a too long time, the process is instable. To avoid this, the beat is forcibly determined. Even when the determination is not correct, the judgement is also made based on the condition 1, hence, correct beat positions will be detected subsequently.

Figure 7:
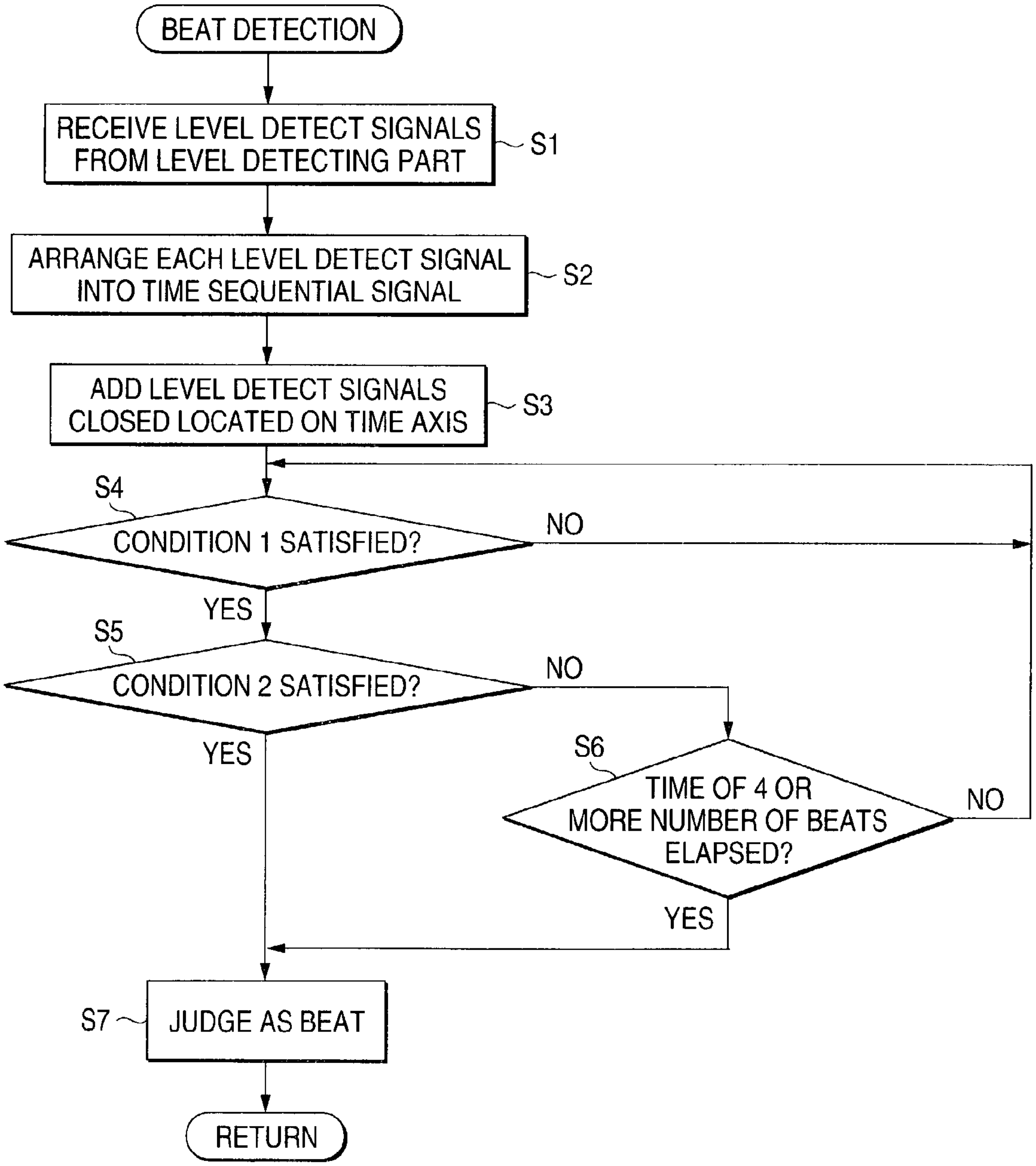
FIG. 7 is a flow chart showing a beat detection process.

A flow of the beat detection process will be described with reference to FIG. 7. FIG. 7 is a flow chart showing the beat detection process. The beat detection process to be described hereunder is carried out by the beat detecting part 38 in the player 2 or 3 shown in FIGS. 1 and 2.

This process is carried out concurrently with a reading operation of a reproduced audio signal from the optical disk. A reproduced audio signal that is read out of the optical disk at a high speed (e.g., quadruple-speed) is temporarily stored into the memory 13 or 23. Then it is read out of the memory 13 or 23, and reproduced in the form of music at a normal speed. The beat detecting part 38 processes level detect data Sdet, which is successively supplied from the level detecting part 35, in the following manner.

The beat detecting part 38 receives a level detect signal for each frequency band from the level detecting part 35 (step S1). The level detect signal is arranged into a time sequential signal as shown in FIG. 5A (step S2). Subsequently, the beat detecting part 38, as shown in FIG. 5B, adds level detect signals closely located on the time axis to added values, and determines peaks based on the added values (step S3). This process is carried out in a manner that the beat detecting part 38 adds the level detect signals (digital data) that are sequentially received thereto from the level detecting part 35. While the beat detecting part sequentially receives the level detect signals from the level detecting part 35, it successively determines peaks based on the added values.

Next, the beat detecting part successively executes the judgement of the condition 1 on the peaks successively determined in the step S3, peak by peak (step S4). If the peak being evaluated satisfies the condition 1, the process returns to the step S4, and judges the next peak. If the peak being evaluated does not satisfy the condition 1 (step S4; yes), the process judges as to if the peak satisfies the condition 2 (step S5).

If it satisfies the condition 2, the process decides that the peak is a beat (step S7). If the peak does not satisfy the condition 2 (step S5; No), the process judges if the peak is located at a time position having elapsed by 4 beats or more from the preceding beat (step S6). If the peak has elapsed by 4 beats or more, the process advances to a step S7, and treats it as a beat. If the peak has not elapsed by 4 beats or more, the process returns to the step S4, and judges the next peak.

In this way, beats are detected from the reproduced audio signal readout of the optical disk. A position of the detected beat is incorporated into a reproduction control signals Scda and Scdb, and the resultant is sent to the sub CPUs 15 and 25.

In the embodiment, the reproduced audio signal read out from the optical disk is divided into the signals of three frequency bands, low, medium and high frequency bands. The reproduced audio signal may be divided into signals of two frequency bands or four or more number of frequency bands. Where the number of frequency bands is increased, the audio signal is little influenced by noise having specific frequencies, and hence detection accuracy is frequently increased.

[Synchronous Reproduction of Two Players]

Figure 8:
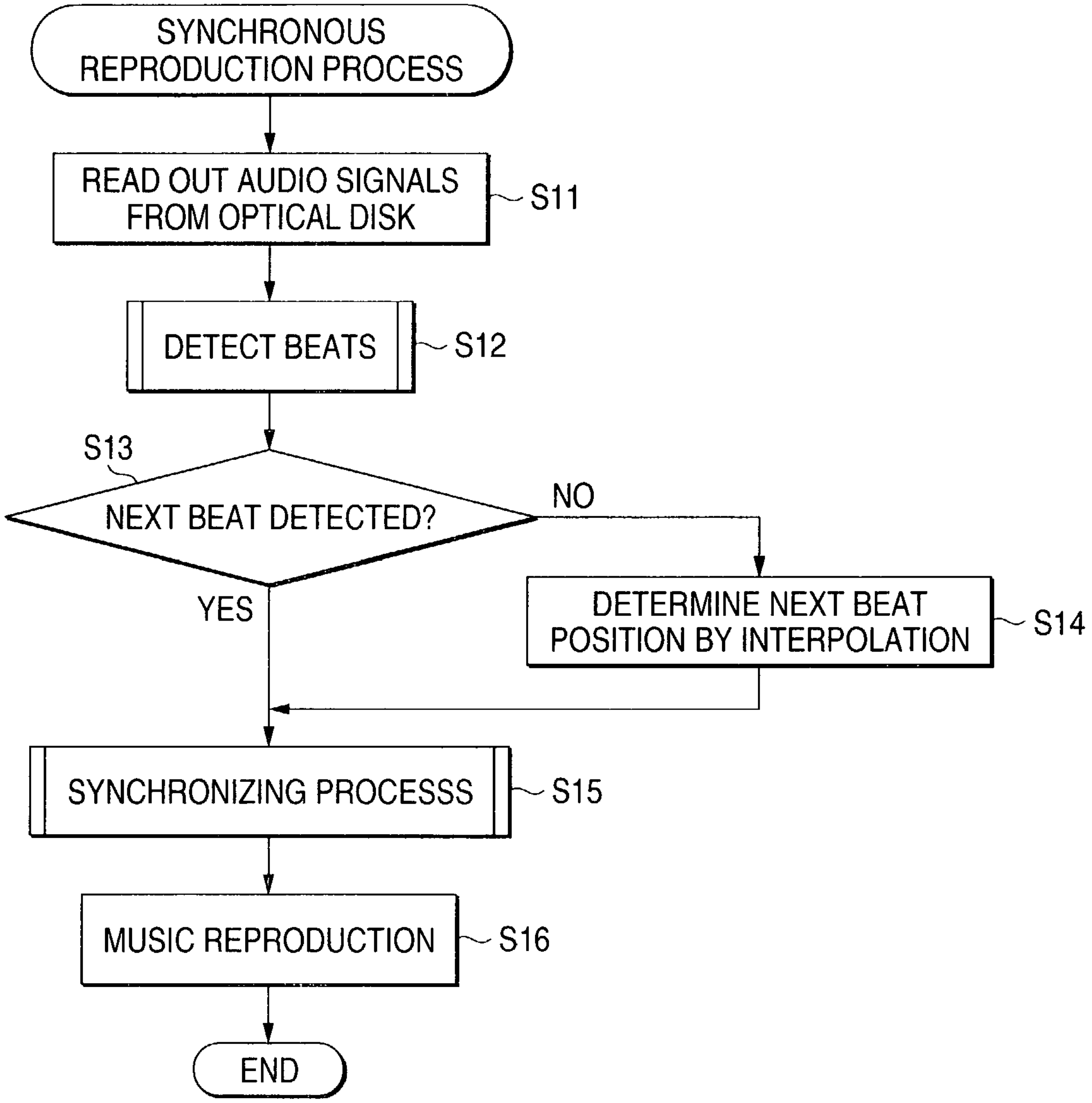
FIG. 8 is a flow chart showing a sync/reproducing process containing the beat detection process.

Next description is given about a synchronous reproduction process which causes two players to synchronously operate by utilizing the thus detected beat positions and the BPM value and to play back music. FIG. 8 shows a flow chart of the synchronous reproduction process. The synchronous reproduction process is realized in a manner that the CPU 30 in the mixer 1, and the sub CPU 15 in the player 2 and the sub CPU 25 in the player 3 (see FIG. 1) execute a program prepared in advance, and mutually operate for process execution.

Firstly, under control of the sub CPU 15, the player 2 starts to read an audio signal from the optical disk DA, and under control of the sub CPU 25 the player 3 starts to read an audio signal from the optical disk DB (step S11).

Then, in the players 2 and 3, the program detects beats from the audio signals by the method as described referring to FIG. 7 (step S12).

The program checks if the next beat is detected in the audio signal to be reproduced in each of the players 2 and 3 (step S13). Specifically, the program judges as to if a beat detection process of the step S12 has detected a beat at a position or its vicinity at which the next beat will arrive, on the basis of the BPM value detected by the BPM detecting part 37 in the DSP 12 or 22.

In the beat detection process, generally, beats are not always detected at all the reproduction positions of a musical piece. Actually, beat positions are periodically present in the musical piece. In a case where a sound volume (level of recorded data) is small at a beat position in an actual musical piece, the beat position is not detected. Accordingly, when the next beat position is not detected by the beat detection process, the scarce beat position is determined, by use of an interpolation, on the basis of the beat positions detected by the beat detection process and the BPM value detected by the BPM detecting part 37 (step S14). Specifically, the beat-to-beat time can be computed from the BPM value. Therefore, the interpolation may be made in a manner that for the detected beat positions, a beat is set at a position or time position on the time axis after the beat-to-beat time has elapsed.

Thus, the beat position is determined, and then a process to synchronizing the players 2 and 3 is executed (step S15). The detail of the synchronizing process is flow charted in FIG. 9.

Figure 9:
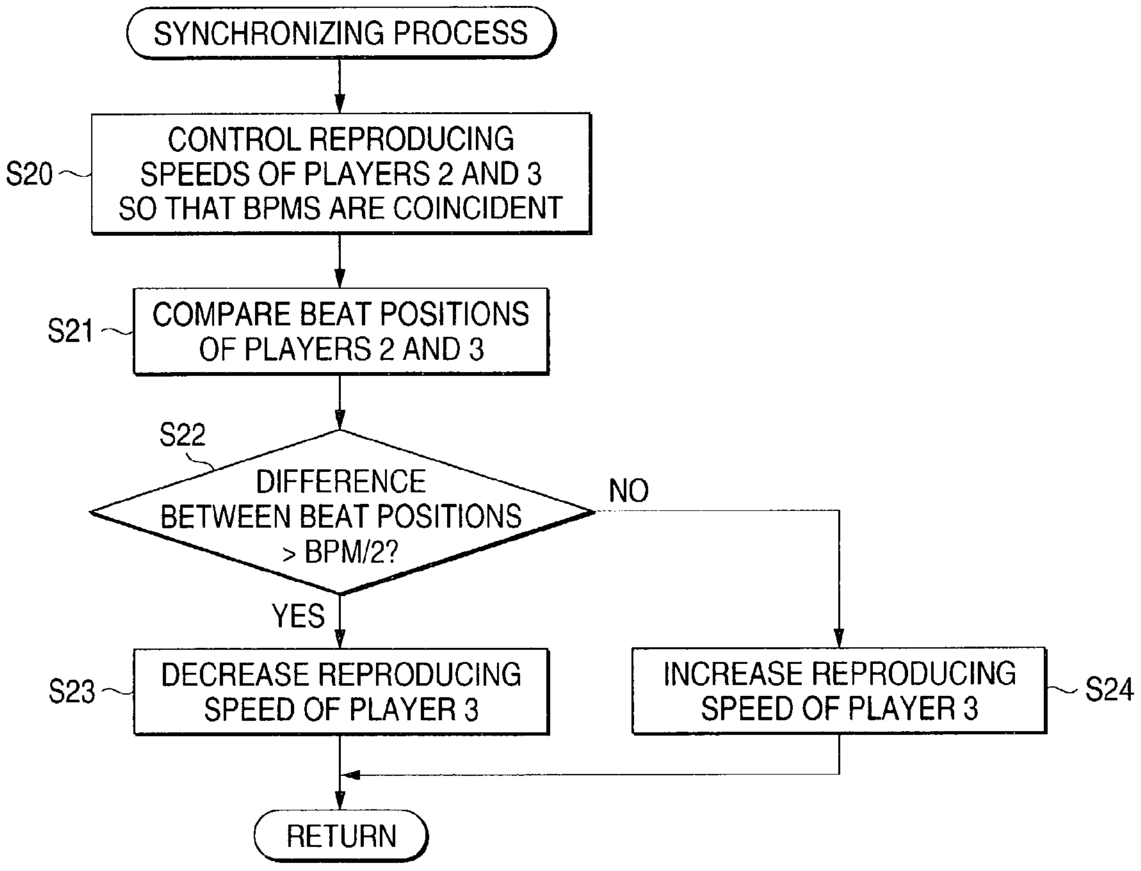
FIG. 9 is a flow chart showing a sync process when the FIG. 8 sync/reproducing process is under execution.

In FIG. 9, the reproducing speed of the player 2 is made equal to that of the player 3 on the basis of the BPM values output from the DSPs 12 and 13 (step S20). Subsequently, the next beat positions obtained in the players 2 and 3 are compared with each other (step S21). In the player 2 (3), a beat position obtained by the beat detecting part 38 in the DSP 12 (22) is input as a reproduction control signal Sbpa (Sbpb) to the sub CPU 15 (25). The sub CPU 15 (25) has determined a scarce beat position by the interpolation in the step S14. Accordingly, the CPU 30 acquires the next beat positions from the sub CPUs 15 and 25 and compares them since the sub CPUs 15 and 25 have recognized the next beat positions in the players 2 and 3.

The CPU 30 executes a process to determine a reproduction position so that the beat positions of the players 2 and 3 are made coincident with each other. The result of the comparison in the step S21 shows that a difference between the next beat positions in the two players is larger than the BPM/2 (step S22; yes). Then, the sub CPU 25 is controlled so as to lower the reproducing speed of the player 3 (step S23). When the difference between the next beat positions in the two players is smaller than the BPM/2 (step S22; No), the CPU 30 controls the sub CPU 25 so that the reproducing speed of the player 3 is increased (step S24).

In this way, the synchronizing process is completed, and the reproduction positions of the players are determined so that the beat positions of the players 2 and 3 are coincident with each other.

The process returns to the synchronous reproduction process of FIG. 8, and both the players 2 and 3 reproduce audio signals (step S16). At this time, in the players 2 and 3, the control of the reproducing rates are continued so that the BPMs that are detected in the DSPs 12 and 22 are coincident with each other. As a result, the musical pieces reproduced by both the players are coincident with each other not only in reproducing speed but also in beat position.

The above process is continuously executed after the musical piece reproducing starts. While the players 2 and 3 are reproducing the musical pieces, the process of FIG. 8 is successively carried out and the musical pieces are synchronously reproduced from both the players.

The case having been described is that in each player, audio information that is read out from the optical disk is temporarily stored into the memory, the next beat position is detected or determined by the interpolation, and the audio information corresponding to the beat position is read out from the memory and reproduced. In some internal construction of the player, there is a case where before the beat position is determined based on the beat detection or the interpolation, the audio information must be reproduced. In such a case, the synchronous reproduction process of FIG. 8 may be executed in a manner that a beat position occurring later is predicted on the basis of a beat position detected by the beat detection process, not the interpolation. In such a case, the synchronous reproduction process may be made to proceed in accordance with correct beat positions by correcting the beat position that is predicted on the basis of the detected beat position after the beat position is actually determined by the beat detection process.

[Detection of Top Beat and Synchronizing Process]

In the synchronous reproduction process, the BPM and the beat position are detected on the basis of the audio information read out of each optical disk, and the two players are controlled so that the reproducing speeds are made equal to each other based on the BPM, and the beat positions are coincident with each other, and under this condition, the musical pieces are reproduced. Where the reproducing speeds are equal to each other and the beat positions are coincident with each other, an unnatural feeling that the listener has when he listens the reproduced musical pieces is small. More strictly, the position coincidence of the top beat (first beat in each bar) of one musical piece with that of the other musical piece, if possible, is more desirable, since the reproduction positions of the musical pieces to be reproduced from the two players are coincident with each other every bar.

To realize this, it is necessary to specify the top beat of those beats detected in the beat detection process (and beats which are replenished with the interpolation or prediction since those are scarce beats). If the top beat is specified, then what one has to do is to control the reproduction positions of the two players so that the top beats are coincident with each other in the synchronizing process of the step S15. Some methods of detecting the top beat will be described.

One top-beat detecting method is that such an operator as a disk jockey manually inputs the position of the top beat to the audio information reproduction device. Specifically, after the music is reproduced and when the synchronous reproduction process is under execution, the operator, while listening the reproduced music, inputs a position of the top beat to the audio information reproduction device, by use of an operation part 31 of the mixer 1. This may be achieved in a manner that the operator presses a specific button provided on the mixer 1 at the timing of the top beat.

Another top-beat detection method is to extract time management information, such as time code, from each musical piece data, and to specify a position of the top beat position by computation. The time management information counted from the top of each musical piece are recorded in such an optical disk as a CD. The time management information takes various forms, such as time code and address, depending on the type of the recording medium. When the operation of reproducing music starts, the BPM of the music is detected by the DSP. Usually, in one musical piece, the BPM value is not varied. Therefore, at a reproduction position in a musical piece, the current position can be computed using the BPM value. Computation can be made of what number of bars counted from the top of the musical piece is the bar in which the reproduction position is contained, and which of the beats contained in that bar is the beat at which the reproduction position is located. If the musical piece is quadruple time and its BPM is 120, 120 beats appear for 60 seconds. Accordingly, one bar (=four beats) corresponds to 2 seconds. Therefore, the top of one bar, viz., top beat, arrives every time 2 seconds elapse from the top of one musical piece. In this way, the top beat of each bar can be detected from the time management information stored in the optical disk.

If the top beat is thus detected, then the musical piece reproduced from the two players can be synchronized every bar by utilizing the BPM and beat positions detected by the DSP and the top beat positions.

[Modifications]

The audio information reproduction device shown in FIGS. 1 and 2 is made up of the mixer 1, and the players 2 and 3. The mixer 1 includes the CPU 30, operation part 31, display part 32, and adder 33. The invention may be applied to such an audio information reproduction device that the CPU 30, operation part 31, display part 32, and the like are contained in the player, and only the adder 33 is contained in the mixer.

In the embodiment mentioned above, the players 2 and 3, which form the audio information reproduction device, are disk players, such as CD players. The dedicated disk players as the players 2 and 3 may be substituted by a personal computer containing a music reproducing software (program).

The function of detecting the beat positions and the function of controlling the reproducing operation of a plurality of musical pieces so that the detected beat positions of the musical pieces are coincident with each other, both of which are based on the invention, may be realized in the form of a software (program). In this case, the musical pieces may be reproduced as in the above-mentioned embodiment which uses the mixer and the players exclusively used, when that program is executed by a personal computer provided with a reproduction drive, such as CD and DVD.

As seen from the foregoing description, the beat positions of a musical piece can be detected from music data recorded in the recording medium, such as an optical disk. Accordingly, the reproducing operations of the musical pieces from two recording media may be synchronized by controlling the two players so that the reproducing speeds of them are equal to each other, and the beat positions are coincident with each other.

What is claimed is:

1. An audio information reproduction device comprising:

reading member for reading audio information constituting a musical piece from a recording medium;

beat detecting member for detecting a beat position in said musical piece on the basis of said audio information; and reproducing member for reproducing said audio information in accordance with said detected beat position.

2. The audio information reproduction device according to claim 1, further comprising:

tempo detecting member for detecting a speed value of said musical piece in accordance with audio information, wherein said beat detecting member detects said beat position by using said speed value.

3. The audio information reproduction device according to claim 2, wherein said beat detecting member includes;

level detecting member for detecting peak levels of said audio information, and judging member for judging if said peak level corresponds to a beat.

4. The audio information reproduction device according to claim 3, wherein said judging member includes;

first judging member for judging as to if a peak being evaluated of said audio information satisfies a first condition that a time interval between said peak being evaluated and the peak preceding said peak being evaluated is integer time as long as a beat-to-beat time interval determined on the basis of said speed value, second judging member for judging as to if said peak being evaluated satisfies a second condition that a time interval between said peak being evaluated and a peak which is located preceding said peak being evaluated and is judged to be a beat, is integer time as long as a beat-to-beat time interval determined on the basis of said speed value, and member for judging said peak being evaluated to be a beat if said peak being evaluated satisfies said first and second conditions.

5. The audio information reproduction device according to claim 4, wherein said judging member further includes;

decision member operating such that when a time interval between said peak being evaluated and a peak which is located preceding said peak being evaluated and is judged to be a beat, is longer than a time interval corresponding to a predetermined number of times as long as said beat-to-beat time interval determined on the basis of said speed value, said decision member decides that a beat is present at a position on a time axis which is spaced from the peak located preceding said peak being evaluated by a distance corresponding to said predetermined number of times as long as said beat-to-beat time interval.

6. The audio information reproduction device according to claim 4, further comprising:

member for interpolating said detected beat position on the basis of said speed value and a beat position detected by said beat detecting member.

7. The audio information reproduction device according to claim 4, further comprising:

member for predicting a beat position on the basis of said speed value and a beat position detected by said beat detecting member.

8. The audio information reproduction device according to claim 3, wherein said judging member further includes;

member which judges a peak that said level detecting member first detects after the reading of said audio information corresponding to one piece of music starts, to be a beat.

9. The audio information reproduction device according to claim 8, further comprising:

member for interpolating said detected beat position on the basis of said speed value and a beat position detected by said beat detecting member.

10. The audio information reproduction device according to claim 8, further comprising:

member for predicting a beat position on the basis of said speed value and a beat position detected by said beat detecting member.

11. The audio information reproduction device according to claim 3, wherein said level detecting member includes;

member for dividing said audio information into a plurality of frequency bands, and member for detecting said peak by adding together said audio information of said frequency bands which are close to each other in time space.

12. The audio information reproduction device according to claim 11, wherein said level detecting member further includes;

member for setting a peak at a position on a time axis after a predetermined time elapses from a position of the peak lastly detected, when said peak is not detected for a predetermined time or longer.

13. The audio information reproduction system comprising:

first and second audio information reproduction devices defined in claim 2; and control member for controlling said first and second audio information reproduction devices so that the speed values and beat positions of first reproduced audio information output from said first audio information reproduction device are coincident with the speed values and beat positions of second reproduced audio information output from said second audio information reproduction device.

14. The audio information reproduction system according to claim 13, wherein said control member includes;

member for controlling said second audio information reproduction device so that a speed value of said second reproduced audio information is coincident with a speed value of said first reproduced audio information, and member for controlling said second audio information reproduction device so that a beat position of said second reproduced audio information is coincident with a beat position of said first reproduced audio information in a state that a speed value of said first reproduced audio information is coincident with a speed value of said second reproduced audio information.

15. The audio information reproduction system according to claim 13, wherein said first audio information reproduction device includes first top beat detecting member for detecting a position of a top beat in said first reproduced audio information, said second audio information reproduction device includes second top beat detecting member for detecting a position of a top beat in said second reproduced audio information, and said control member controls said second audio information reproduction device so that the top beat of said second reproduced audio information is coincident in position with the top beat of said first reproduced audio information.

16. The audio information reproduction system according to claim 15, wherein said first and second top beat detecting member detect each the timing at which an operator operates an input device as the position of said top beat.

17. The audio information reproduction system according to claim 15, wherein said first and second top beat detecting member detect a position of each said top beat on the basis of time management information stored for each musical piece on said recording medium.

18. An audio information reproduction device comprising:

reading member for reading audio information constituting a musical piece from a recording medium;

tempo detecting member for detecting a speed value in said musical piece on the basis of said audio information;

beat detecting member for detecting a position of a beat in said musical piece from audio information by using said speed value;

top beat detecting member for detecting a position of a top beat in said reproduced audio information; and reproducing member for reproducing said audio information in accordance with said speed value, said beat position, and said top beat position.

19. The audio information reproduction system according to claim 18, wherein said top beat detecting member detects the position of said top beat on the basis of time management information stored for each musical piece on said recording medium.

20. A computer program causing a computer to function as an audio information reproduction device comprising:

reading member for reading audio information constituting a musical piece from a recording medium, beat detecting member for detecting a beat position in said musical piece on the basis of said audio information, and reproducing member for reproducing said audio information in accordance with said detected beat position.

* * * * *